US007565547B2

(12) United States Patent
Matta et al.

(10) Patent No.: US 7,565,547 B2
(45) Date of Patent: Jul. 21, 2009

(54) TRUST INHERITANCE IN NETWORK AUTHENTICATION

(75) Inventors: Johnny Mikhael Matta, Montréal (CA); Tarik Alj, Montréal (CA); John Robertson Campbell, Ottawa (CA); Probal Kanti Lala, Toronto (CA)

(73) Assignees: Sesame Networks Inc., Ottawa, Ontario (CA); AirRoamer Inc., Toronto, Ontario (CA)

( * ) Notice: Subject to any disclaimer, the term of this patent is extended or adjusted under 35 U.S.C. 154(b) by 844 days.

(21) Appl. No.: 11/067,488

(22) Filed: Feb. 25, 2005

(65) Prior Publication Data

US 2005/0198534 A1 Sep. 8, 2005

Related U.S. Application Data

(60) Provisional application No. 60/547,779, filed on Feb. 27, 2004.

(51) Int. Cl.
*H04L 9/00* (2006.01)
*H04L 9/32* (2006.01)
(52) U.S. Cl. .......................................... 713/182; 726/2
(58) Field of Classification Search ................. 713/183, 713/182; 726/2
See application file for complete search history.

(56) References Cited

U.S. PATENT DOCUMENTS 6,012,144 A   1/2000   Pickett (Continued)

FOREIGN PATENT DOCUMENTS

CA   2487055   12/2003

OTHER PUBLICATIONS

Delegate: A Proxy Based Architecture for Secure Website Access from an Untrusted Machine Jammalamadaka, R.C.; van der Horst, T.W.; Mehrotra, S.; Seamons, K.E.; Venkasubramanian, N.; Computer Security Applications Conference, 2006. ACSAC '06. 22nd Annual Dec. 2006 pp. 57-66.*

(Continued)

*Primary Examiner*—David Y Jung
(74) *Attorney, Agent, or Firm*—Hallie A. Finucane; Westman, Champlin & Kelly, P.A.

(57) ABSTRACT

A system and method for providing ad hoc controlled user access to wireless and wireline IP communication networks while maintaining privacy for users and traceability for network providers. The method includes an authentication interface accepting user credentials, and a validation entity for credential verification and access authorization. The credentials include a unique identifier and a system generated password. The unique identifier is associated with a personal entity of the user such as a cellular telephone. The password is transmitted to the user through a SMS message to his cellular telephone. The user's Internet session is monitored by the system and all records are indexed by his cellular telephone number. The system and method therefore permit fast and traceable access for guest users at networks where they are were not previously known. Alternatively, users do not provide their unique identifiers such as cellular telephone numbers which are instead already stored in the system. A user provides a username and a one time password is generated by the system and sent to the user by SMS. This enables the system to validate the user's identity as well as the user to validate the Internet resources' identity.

70 Claims, 8 Drawing Sheets

U.S. PATENT DOCUMENTS

| | | |
|---|---|---|
| 6,567,915 B1 | 5/2003 | Guthery |
| 2004/0097217 A1 | 5/2004 | McClain |

OTHER PUBLICATIONS

Trade-off Analysis of Identity Management Systems with an Untrusted Identity Provider Elahi, G.; Lieber, Z.; Yu, E.; Computer Software and Applications, 2008. COMPSAC '08. 32nd Annual IEEE International Jul. 28, 2008-Aug. 1, 2008 pp. 661-666.*

Klassp: Entering Passwords on a Spyware Infected Machine Using a Shared-Secret Proxy Florencio, D.; Herley, C.; Computer Security Applications Conference, 2006. ACSAC '06. 22nd Annual Dec. 2006 pp. 67-76.*

International Search Report of PCT/CA/2005/000284.

* cited by examiner

Ad hoc guest user
authentication system

Web authentication interface (23)

TRUST INHERITANCE IN NETWORK AUTHENTICATION

The present invention claims priority to U.S. Provisional Patent Application Ser. No. 60/547,779 filed Feb. 27, 2004.

FIELD OF THE INVENTION

The present invention relates generally to IP communication networks and, more particularly, to an inherited trust authentication mechanism that enables and facilitates ad hoc controlled user access to wireless and wireline IP communication networks while maintaining privacy for users and traceability for network providers.

BACKGROUND OF THE INVENTION

Digital data networks have become a ubiquitous part of business, commerce, and personal life throughout the United States and the world. The public Internet and private local area networks (LANs) have become increasingly important backbones of data communication and transmission. Email, file access and sharing, and services access and sharing are but a few of the many data communication services and applications provided by such networks.

In their early expansion, those networks were typically accessed by fixed users communicating through electronic access terminals such as laptop and desktop computers, over wireline connections. With the recent spread of wireless local area networks (WLANs) and popularity of portable electronic access terminals, such as laptops and personal digital assistants (PDAs), an increasing proportion of users have taken a nomadic nature: a growing number of users now carry at least one personal electronic access terminal and seek instant yet temporary network access at a variety of locations with whom they have neither previous accounts nor long term relationships. This is especially true of corporate users who often seek network access at visited corporations, airports, hotels, restaurants, and others.

To this date, technology advances in network access equipment and systems have mainly focused on enabling access for fixed users connecting over residential or business broadband and dial up Internet lines; as well as mobile employees connecting over wireless local area networks (WLANs) stretching across their corporate premises. In the latter case, security issues inherent to the nature of wireless networks have prompted large academic, industry and standardization activities for the development of new technologies that can enable secure access over such networks. Particularly, the focus is on securing the communication channels themselves through encryption protocols (WEP, TKIP, AES and others), and introducing robust authentication mechanisms to authorize and track user access to the network. In those cases, users are assumed to be employees or known individuals with long term relationships with the corporation or preexisting accounts, and often preconfigured electronic access terminals such as laptop and desktop computers and personal digital assistants (PDAs). This is especially trues of employees with a long term and often contractual relationship with their employers.

Less effort was dedicated to infrastructures that can support nomadic users with a need for instant and temporary access at foreign networks where such users have neither previous accounts nor a long term relationship with the network provider. While current WLAN technologies can be made open to any user, known or unknown, concerns for the security, reliability and integrity of the host network, especially one that builds on a larger corporate data system, make most network providers hesitant to providing guest access for unknown nomadic (or guest) users. Network providers therefore have an understandable need for traceability of access and verification of user identity, especially for guest users. Additionally, any solution to the problem of short term guest access must allow controlled access once a user has been identified, restrict access to un-identified users, protect the corporate LAN from attack, provide simplicity both for the end user and for IT personnel, minimize costs and meet user privacy expectations, that are increasingly guaranteed by new legislation.

A number of solutions are in use today to address the problem of providing temporary guest access. The simplest approach is the one described above, namely providing open access to any user, known or unknown. Obviously, such an approach removes any form of traceability and identity verification, and poses security and reliability threats to the underlying corporate network.

Another method consists in IT personnel on site providing temporary guest IDs. This method may provide traceability since guests may have to at least provide their name to obtain a temporary ID. However, it introduces the cost of assigning IT personnel to this task as well as provides direct access to the private corporate network thus violating the need for protecting that network from foreign users.

A third solution is to assign a few computers on the network for guests. In addition to the cost for IT personnel of maintaining the units, this solution provides no traceability whatsoever; it also forces guest users to abandon their own electronic terminal thus complicating if not eliminating access to their electronic material and remote corporate networks.

Yet another solution is to force guest attempting access within a wireless local area network (WLAN) hotspot to go through a web based registration page. Users are instructed to provide varying levels of personal information such as name, email address, telephone number, and others. Users are then granted access through the account that has been created for them by the system based on the information they have provided. While convenient for the users, such a setup in fact provides no traceability of guest access since users may intentionally provide false information upon registration and no attempt is made by the system to validate their identity.

Finally, a simple solution is to dedicate phone lines for guest dial-up usage. This solution obviously removes any threats to the local corporate network, need for traceability and burden on IT personnel but it significantly lowers the flexibility and speed of a guest access system; moreover, with the spread of broadband connections, a large number of guests may not have dial up accounts anymore.

SUMMARY OF THE INVENTION

The present invention discloses an inherited trust authentication mechanism that enables and facilitates ad hoc controlled user access to wireless and wireline IP communication networks while maintaining privacy for users and traceability for network providers. The system includes a user equipped with an electronic terminal and a personal entity where the user typically accesses an authentication interface through his electronic terminal to provide a unique identifier associated with his personal entity. The authentication interface communicates with a validation entity that verifies the user's privileges based on his unique identifier and if authorized grants the user access to network resources. The unique identifier is characterized by the fact that it relates to a personal entity whose relationship with the user had previously been established through a trusted third party telecommunications provider. A preferred embodiment is for users' personal entities to be cellular telephones whereby the unique identifier is the cellular telephone's number. The relationship between the user and his cellular telephone number must have been previously established with his mobile telephony provider and therefore comes with a high trust level in the user's identity. In effect, the adoption of cellular telephones as preferred personal entities stems from the high trust level in user identity inherent to every relationship between telephony providers and their customers, in addition to the mobility characteristic of cellular telephones that make them popular with nomadic users. The user communicates through a laptop computer, or personal digital assistant (PDA) or IP telephone with a web based authentication interface to provide his cellular telephone number. The validation entity consists of a database and authentication, authorization and accounting (AAA) servers and will verify the existence of an account indexed by the cellular telephone number. If no account exists, it will create one, and generate a corresponding password. If an account exists, it will retrieve the password. In both cases, the password is then transmitted to the cellular telephone number of the user through SMS. The user will now enter both his cellular telephone number and received password into the web authentication interface thereby gaining access to network resources such as the Internet or other local servers and electronic equipment. In effect, the trust relationship previously established between the user and the mobile telecommunications provider of his cellular telephone is inherited by the system thus enabling traceability of the user during his access to network resources.

In another embodiment, a variation of the mechanism detailed above is used to ensure known users are accessing legitimate Internet resources such as secure and protected websites. In this case, users do not provide their unique identifiers such as cellular telephone numbers which are instead already stored in the system. A user provides a username to the authentication interface and a one time password is generated by the system and sent to the user by SMS using the cellular telephone number already stored in the system. This mechanism prevents scams such as phishing where users are tricked into providing personal and private information to malicious web sites that pretend to be legitimate web sites known to the user. Indeed, only legitimate sites are assumed to know the cellular telephone number of the user. In effect, the trust relationship previously established between the user and legitimate sites is inherited by the system upon user login time thus enabling the system to validate the user's identity as well as the user to validate the Internet resources' identity such as banking or other private sites.

Thus, in a first aspect, the invention concerns a method for authenticating a user so that said user is able to access electronic services through an untrusted electronic terminal, said method comprising the steps of:
(a) providing to an authentication interface a unique identifier of a trusted personal entity associated with said user;
(b) sending said unique identifier to at least one validation entity;
(c) identifying said unique identifier as an authentication request at said validation entity by an authentication application;
(d) looking up with said identifier in said validation entity whether said unique identifier is already registered in said validation entity:
  a. if said user is registered with said validation entity, retrieving a password associated with said unique identifier, and sending said password to said personal entity;
  b. if said user is not registered with said validation entity, said authentication application creating an account in said validation entity, generating a password and sending said password to said personal entity;
(e) said user, after retrieving said password, providing said unique identifier and said password to said authentication interface, whereby an application permits access to electronic services through said electronic terminal and said application recording said electronic services to an account associated with said unique identifier.

Yet another aspect of the invention concerns a system for authenticating a user so that said user is able to access electronic services through an untrusted electronic terminal, said user being associated with a trusted personal entity, said personal entity having a unique identifier, said system comprising:
(a) an authentication interface, said authentication interface being adapted to receive said unique identifier and to send said unique identifier to at least one validation entity;
(b) said validation entity adapted to receive said unique identifier and recognize said unique identifier and send a password associated with said unique identifier to said personal entity when an account associated with said personal entity already exists or create an account, generate a password and send said password to said personal entity if an account associated with said unique identifier is inexistent;
(c) whereby said authentication interface is further adapted to receive said unique identifier and said password and to enable access to said electronic services through said electronic terminal upon confirmation.

Still another aspect of the invention concerns a method of tracing untrusted electronic terminals to specific users, said method comprising the steps of:
(a) accessing an authentication interface through said electronic terminal and inputting a unique identifier of a personal entity associated with said user;
b) sending said unique identifier to at least one validation entity;
(c) identifying said unique identifier as an authentication request at said validation entity;
(d) looking up with said identifier in said validation entity whether said unique identifier is already registered in said validation entity:
  a. if said user is registered with said validation entity, retrieving a password associated with said unique identifier, and sending said password to said user;
  b. if said user is not registered with said validation entity, said authentication application creating an account in said validation entity, generating a password and sending said password to said user.
(e) said user, after retrieving said password, providing said unique identifier and said password to said authentication interface, whereby an application permits access to electronic services and said application tracing said electronic services to an account associated with said unique identifier and said electronic terminal.

Yet another aspect of the invention concerns a system for tracing untrusted electronic terminals to specific users so that said user is able to access electronic services through an electronic terminal, said user being associated with a personal entity, said personal entity having a unique identifier, said system comprising:
- (a) an authentication interface, said authentication interface being adapted to receive said unique identifier and to send said unique identifier to at least one validation entity;
- (b) said validation entity adapted to receive said unique identifier and recognize said unique identifier and send a password associated with said unique identifier to said personal entity when an account associated with said personal entity already exists or create an account, generate a password and send said password to said personal entity if an account associated with said unique identifier is inexistent;
- (c) whereby said authentication interface is further adapted to receive said unique identifier and said password and to enable access to said electronic services through said electronic terminal upon confirmation.

Another aspect of the invention concerns a method for authenticating a user known to a service provider so that said user is able to access electronic services through an electronic terminal, said method comprising the steps of:
- (a) providing to an authentication interface a username;
- (b) sending said username to at least one validation entity;
- (c) identifying said username as an authentication request at said validation entity by an authentication application;
- (d) looking up with said username in said validation entity whether said username is already registered in said validation entity:
  - a. if said username is registered with said validation entity and if a unique identifier of a personal entity associated with said user is already contained in said validation entity, generating a one-time password and sending said password to said personal entity using said unique identifier;
  - b. if said user is not registered with said validation entity or if a unique identifier is not already stored in the account, said authentication application rejecting user access;
- (e) said user, after retrieving said password, providing said username and said password to said authentication interface, whereby an application permits access to electronic services through said electronic terminal and said application recording said electronic services to an account associated with said unique identifier.

A further aspect of the invention concerns a system for authenticating a known user so that said user is able to access electronic services through an electronic terminal, said user being associated with a username and a personal entity, said personal entity having a unique identifier, said system comprising:
- (a) an authentication interface, said authentication interface being adapted to receive said username and to send said username to at least one validation entity;
- (b) said validation entity adapted to receive said username and recognize said username and find said unique identifier associated with said user's personal entity and generate a one-time password associated with said username and send said password to said user using said unique identifier when an account associated with said username already exists or reject user access if an account associated with said username is inexistent;
- (c) whereby said authentication interface is further adapted to receive said username and said password and to enable access to said electronic services through said electronic terminal upon confirmation.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION OF THE PREFERRED EMBODIMENTS OF THE INVENTION

Figure 1:
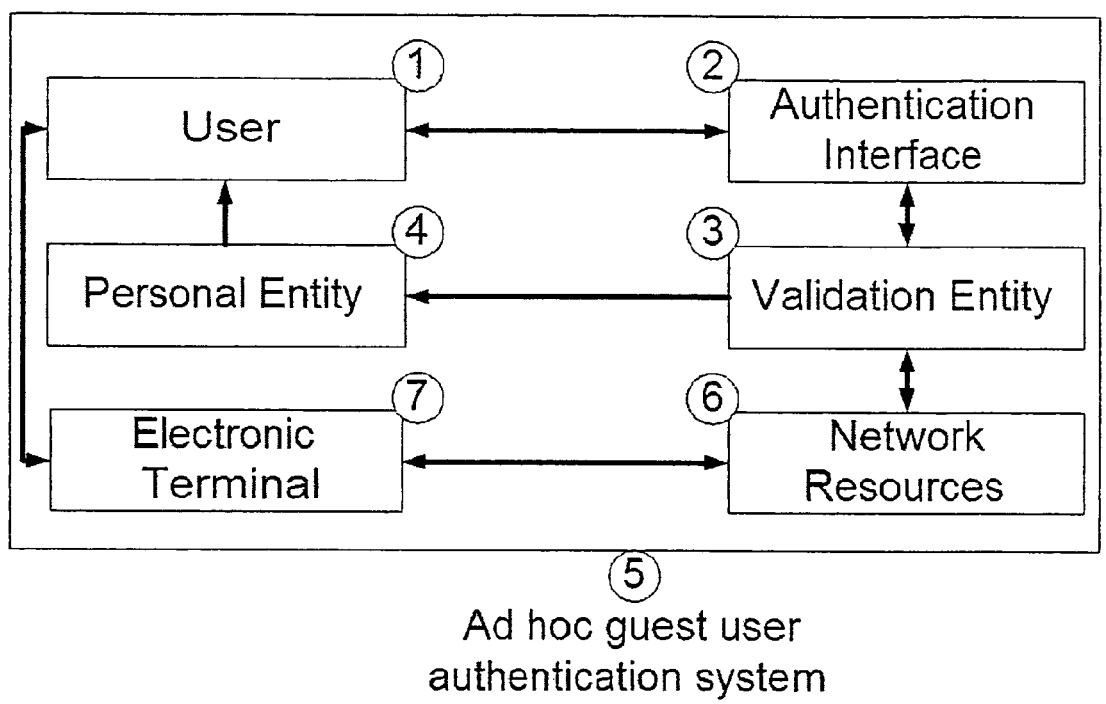
FIG. 1 is a system-level block diagram of the authentication mechanism.
Figure 2:
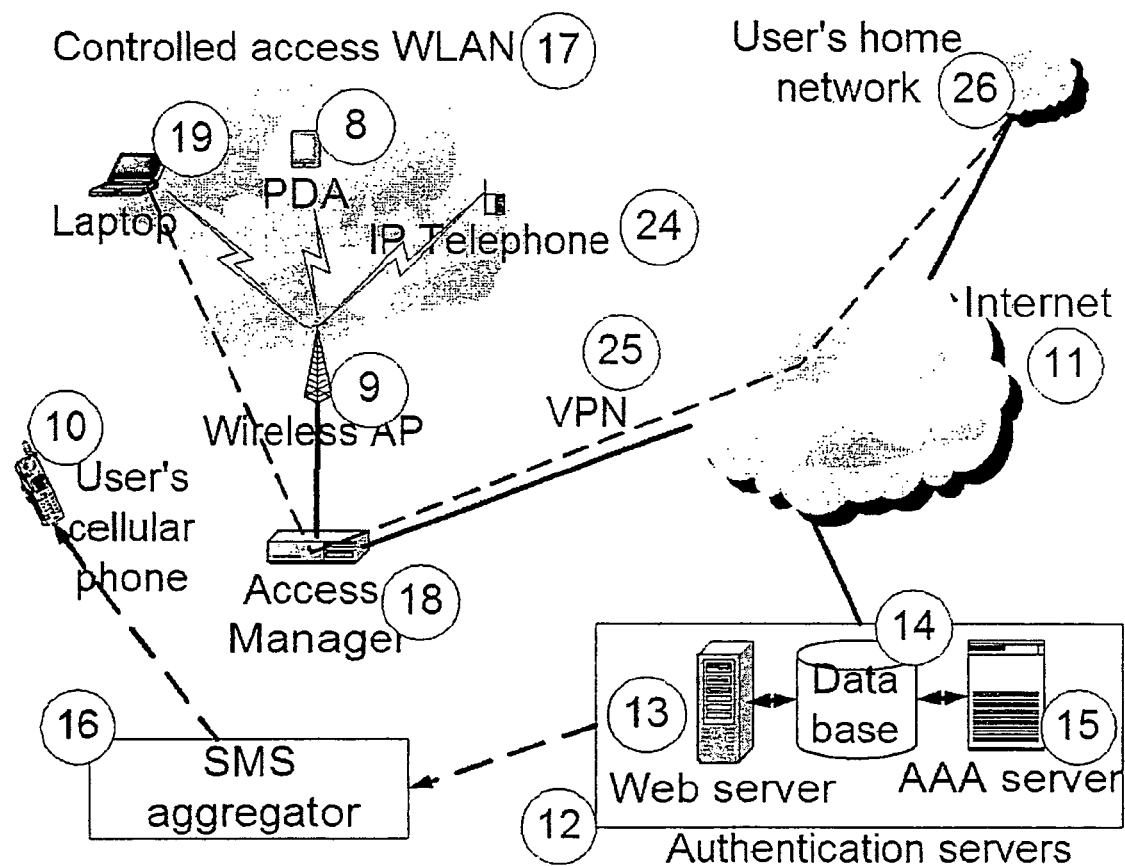
FIG. 2 is a system-level block diagram of a standalone WLAN guest Internet access solution.

Referring collectively to FIGS. 1 and 2, the present invention discloses an ad hoc guest user network provisioning system 5, for use in a controlled access wireless LAN 17, which is preferentially an IP access network. The ad hoc guest user network provisioning system 5 includes an authentication interface 2, which allows a user 1 to authenticate with a validation entity 3 and use an electronic terminal 7 to gain access to network resources 6 such as the Internet 11. The authentication interface 2 and validation entity 3 exchange information about the user 1. Electronic terminals 7 typically consist of a computing device capable of accessing network resources 6 over a variety of network connections such as wireline or wireless links. Various types of electronic terminals 7 are also supported by the system 5 such as laptop computers 19, personal digital assistants (PDAs) 8 or IP telephones 24. In order to access network resources 6, a user 1 provides a unique identifier associated with his personal entity 4 to the authentication interface 2. In turn, the authentication interface 2 communicates with a validation entity 3 that verifies the existence of an account associated with the personal entity 4, or creates an account and password if no previous one exists. The validation entity 3 then communicates the password to the personal entity 4 that the user 1 can access. The user 1 finally provides the unique identifier described above and the newly acquired password to the authentication interface 2 to gain access to network resources 6. The ad hoc guest user network provisioning system 5 could be used with various types of personal entities 4 such as cellular phones or pagers. In effect, the trust relationship previously established between the user 1 and the provider of his personal entity 4 (such as cellular operator for cellular phones or pager operator for pagers) is inherited by the system 5 thus enabling traceability of the user 1 during his access to network resources 6 at the controlled access WLAN location 17.

Figure 6:
FIG. 6 is an example web authentication interface.
Figure 7:
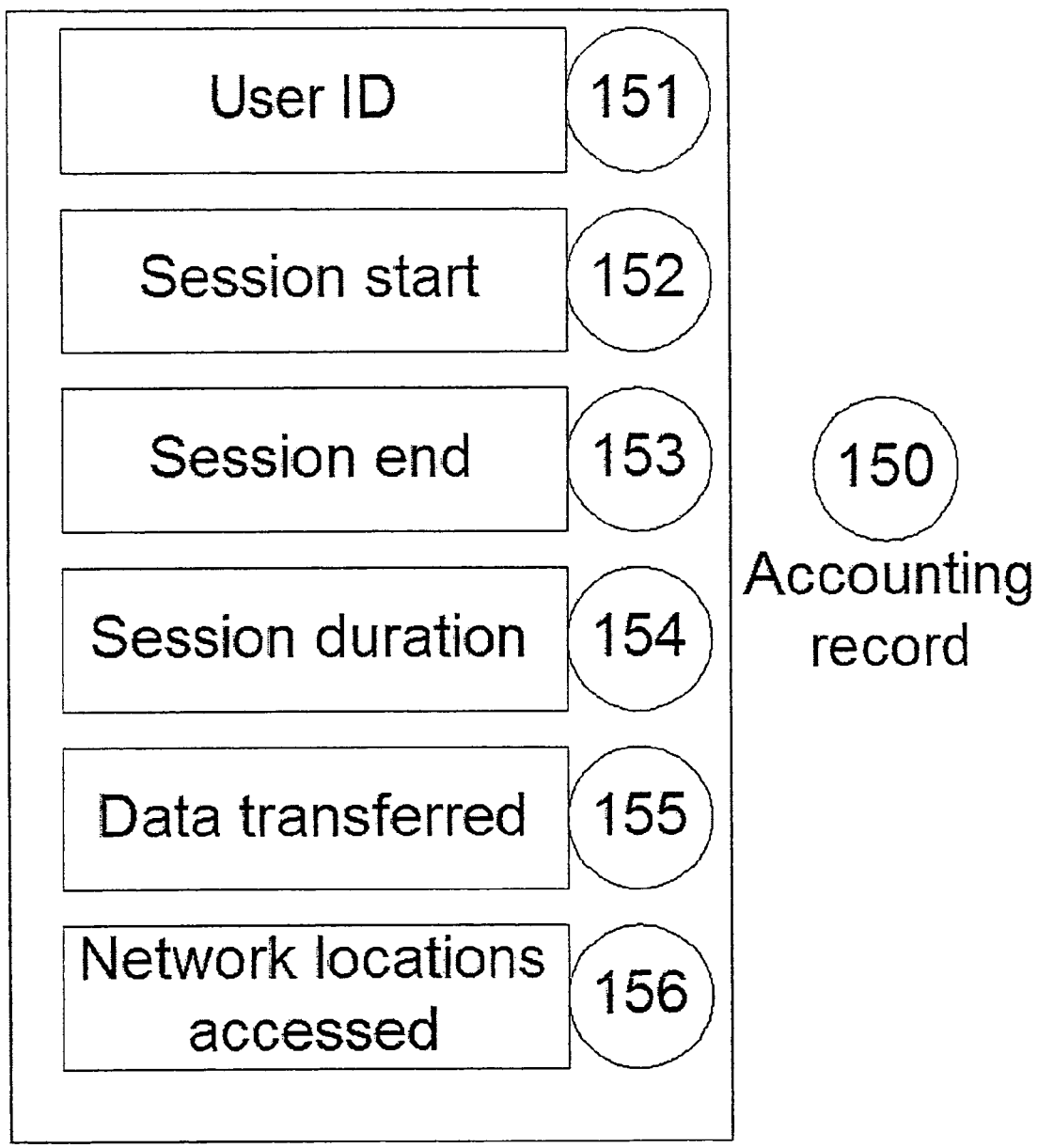
FIG. 7 is an illustration of a network session authentication record.

Referring collectively to FIGS. 1, 2 and 6, in a preferred embodiment, the authentication interface 2 can be seen as a web interface 23 residing on web server 13 that belongs to an authentication server farm 12. The validation entity 3 is also preferably implemented through a combination of a database server 14 and an AAA (Authentication, Authorization and Accounting) server 15 that both belong to an authentication server farm 12. The database 14 and AAA server 15 are preferentially centralized in the server farm 12, but can also be distributed across a number of locations communicating over the Internet 11. Once the user 1 inputs the unique identifier of his personal entity 4 such as his cellular telephone 10 number into web form field 20 in a web-based authentication interface 23, this latter communicates the cellular telephone 10 number to an AAA server 15. The AAA server 15 verifies with the database server 14 whether an account for this user 1 and personal entity 4 already exists. If not, an account is created at the database server 14 and a password for this account is generated. If an account already exists, the associated password is retrieved. The AAA server 15 then transmits this password to the personal entity 4 using the unique identifier (in this case a cellular telephone 10 number) provided by the user 1 at the web authentication interface 23; in a preferred embodiment, this message is conveyed through SMS using the cellular telephone 10 number. The user 1 then inputs his cellular telephone number in web form field 20 on the web interface 23 and the password received on the personal entity 4 in web form field 21 of web interface 23. The user 1 then gains access to network resources 6 such as the Internet 11 through his electronic terminal 7 that is preferentially a laptop 19 or PDA 8 or IP telephone 24.

In a preferred embodiment, the personal entity 4 is a cellular telephone 10 although those skilled in the art should recognize that the personal entity 4 can also consist in a variety of trusted personal communication devices with unique identifiers such as pagers with a unique pager number, mobile fax machine with a unique cellular fax number, mobile laptop computers with a unique email address, mobile personal digital assistants (PDAs) with a unique email address, or mobile IP telephones with a unique IP telephone number. In this preferred embodiment, the validation entity 3 transmits the password retrieved from the database server 14 by SMS through an SMS aggregator 16. Those skilled in the art should also recognize that an SMS message can be transmitted by other means such as directly through the cellular telephone operator using dedicated APIs or by sending an email address for those cellular operators that provide an email account associated with each cellular telephone number.

Referring to FIG. 2, the controlled access WLAN environment 17 preferably includes wireless electronic terminals such as laptop computers 19, personal digital assistants (PDAs) 8 or IP telephones 24. The WLAN environment 17 also includes one or more wireless access points (APs) 9. Electronic terminals 19, 8 and 24 communicate with APs 9 over a wireless link. AP 9 further communicates with an access manager 18 that controls the communication between the controlled access WLAN 17 and network resources 6 such as the Internet 11. Those skilled in the art will also recognize that electronic terminals can communicate with the access manager 18 directly over wireline links. Additionally, AP 9 and access manager 18 can communicate over wireline (illustrated) or wireless links (not illustrated). The access manager 18 links to the Internet 11. Furthermore, an authentication server farm 12 comprising at least one web server 13, one database server 14, one AAA server 15 as well as possibly other types of servers and networking equipment (not illustrated), communicates with the Internet 11. Access manager 18 and authentication servers 12 communicate over the Internet.

Referring again to FIGS. 1 and 2, a user that accesses the Internet 11 using his electronic terminal may also access his remote home network 26 over secure virtual private network (VPN) connections 25. This will allow him to use his remote home network 26 resources as if he was indeed physically located within his home network 26.

Figure 4:
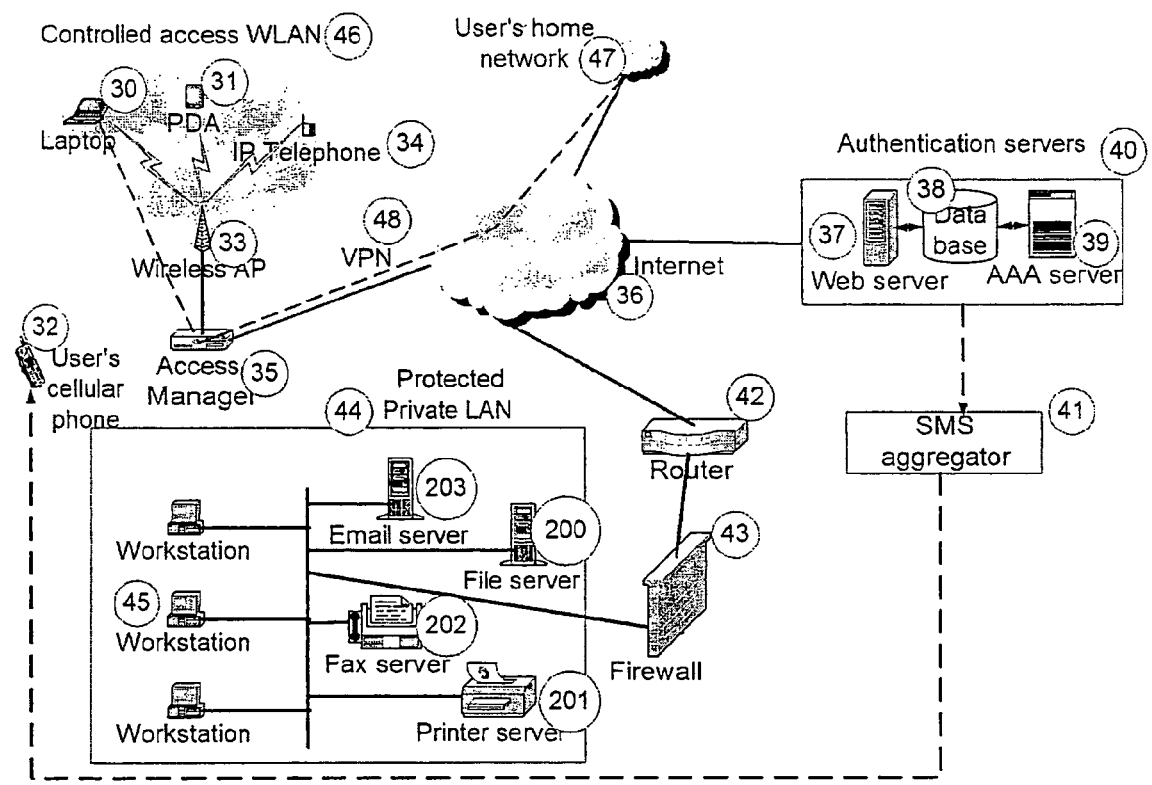
FIG. 4 is a system-level block diagram of a dual network WLAN guest Internet access solution.

In yet another preferred embodiment, the ad hoc guest user network provisioning system 5 of FIG. 1 can be implemented as illustrated in FIG. 4. In this case, the controlled access wireless LAN 46 still includes a plurality of electronic terminals such as laptop computers 30, PDAs 31 and IP telephones 34, and still communicates to other network areas through an access manager 35. However, the configuration now includes a protected private local area network (LAN) 44 that contains one or more workstations 45. Users in the controlled access wireless LAN 46 are restricted from access to the protected private LAN 44 through a firewall 43. Networks 46 and 44 link through a router device 42 that in turn communicates with the broader internet 36. Again, a set of remote authentication servers 40 links to the Internet 36 to enable authentication of users within the controlled access wireless LAN 46. The configuration of FIG. 4 enables the coexistence of one or more private networks 44 and controlled WLAN 46 areas. Guest users access network resources such as the Internet 36 from within 46 but are restricted from access to 44. Again, as described in the case of FIG. 1, a user that accesses the Internet 36 using his electronic terminal may also access his remote home network 47 over secure virtual private network (VPN) connections 48. This will allow him to use his remote home network 47 resources as if he was indeed physically located within his home network 47.

Figure 5:
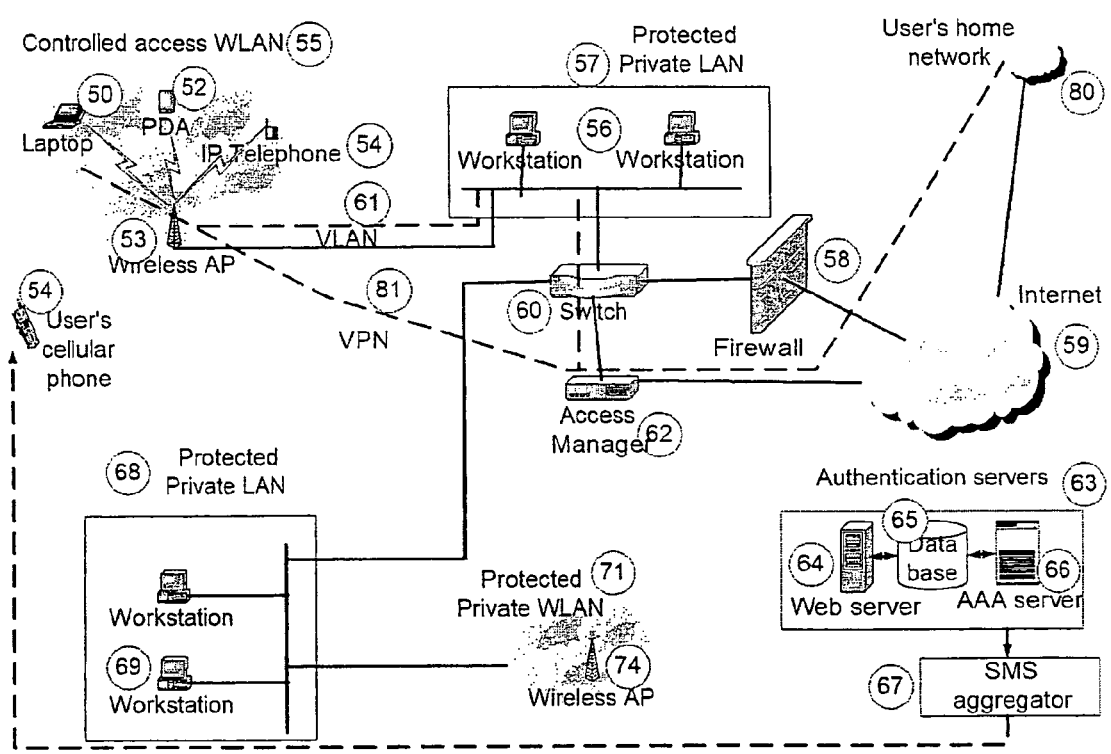
FIG. 5 is a system-level block diagram of an enterprise WLAN guest Internet access solution.

In yet another preferred embodiment, the ad hoc guest user network provisioning system 5 of FIG. 1 can be implemented as illustrated in FIG. 5. In this case, the controlled access wireless LAN 55 still includes a plurality of electronic terminals such as laptop computers 50, PDAs 52 and IP telephones 54. However, its APs 53 now link to one or more protected private LANs 57. Those LANs contain one or more private workstations 56. LAN 57 links to a networking switch 60 that in turn connects to one or more corporate firewalls 58 that finally link to the Internet 59. The APs 53 communicate with an access manager 62 across a virtual local area network (VLAN) setup that extends from the APs 53, across the protected private LAN 57, through switch 60 and down to the access manager 62. This latter links directly to the Internet. In addition, other protected LANs 68 that includes one or more workstations 69 can be supported by this setup as they link to switch 60. Finally, other private WLAN areas 71 may also exist within this system with users from WLAN area 55 being restricted from access to 71.

Again, a set of remote authentication servers 63 links to the Internet 59 to enable authentication of users within the controlled access wireless LAN 55. The configuration of FIG. 5 enables the coexistence of one or more private networks 57, 68 and 71 with controlled WLAN 55 areas. Guest users access network resources such as the Internet 59 from within 55 across private LAN 57 but are prevented from accessing protected resources within 57 through a VLAN 61 setup. Again, as described above, a user that accesses the Internet 59 using his electronic terminal may also access his remote home network 80 over secure virtual private network (VPN) connections 81.

Figure 3:
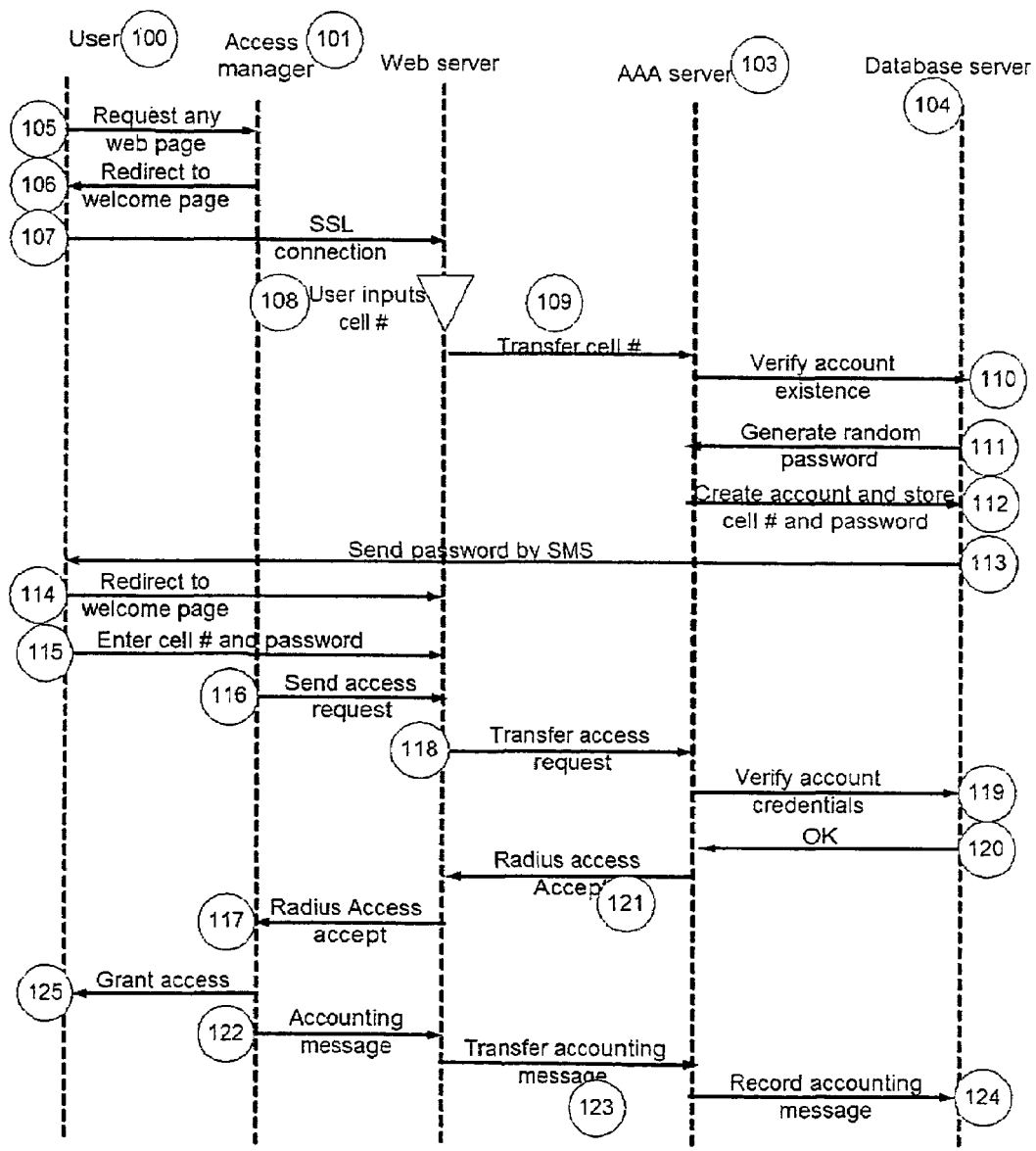
FIG. 3 is a simplified authentication flowchart.

Referring collectively to FIGS. 1, 3 and 6, a preferred authentication flowchart is illustrated. The electronic terminals 7 such as laptop computers 19 or PDAs 8 or IP Telephones 24, of user 1, 100 preferably initiate a web page request 105. This request arrives at the access manager 18,

101 that forces a web redirection 106 to a web page such as 23. The electronic terminal 7 of user 1, 100 then initiates a secure socket layer (SSL) connection 107 to the remote web server 13, 102 that sits within the authentication server farm 12. At that point 108, user 1, 100 preferentially inputs his cellular telephone 10 number into web form field 20 of web interface 23. Web server 13, 102 transfers that cellular telephone number to the AAA server 15, 103 that also preferentially sits within server farm 12; this is illustrated by step 109. At step 110, AAA server 15, 103 verifies the account existence at the database server 14, 104 that also preferentially sits within server farm 12. Assuming no account is found, database server 14, 104 generates one along with a password at step 111. The password is stored at step 112. Finally, database server 14, 104 sends the password by SMS at step 113 to the personal entity 4 of user 1, 100; in this preferred embodiment, the personal entity 4 being a cellular telephone 10. The electronic terminal 7 of user 1, 100 is now redirected at step 114 to a welcome page such as illustrated by web interface 23. User 1, 100 now inputs the cellular telephone 10 number in web form field 20 of web interface 23 and the received password in web form field 21 of web interface 23. The access manager 18, 101 now initiates an access request 116 to web server 13, 102. This access request is preferentially transmitted over a RADIUS protocol message although those skilled in the art will recognize that other authentication protocols such as PANA or DIAMETER may be used for that purpose. Web server 13, 102 now forwards the access request to the AAA server 15, 103. In another preferred embodiment (not illustrated), the access request can go directly from the access manager 101 to the AAA server 13, 102. In yet another preferred embodiment (not illustrated) the electronic terminal 7 of user 1, 100 can send the access request itself. Once the AAA server 15, 103 receives the access request, it verifies the credentials, namely cellular telephone number and password with the database server 14, 104. Upon confirmation of validity at step 120, AAA server 15, 103 sends back a Radius access Accept message to web server 13, 102 at step 121. This results is forwarded to access manager 18, 101 that grants access to user 1, 100 at step 125. Further protocol messages for session accounting and recording purposes are carried on at steps 122, 123 and 124. Accounting is performed during the entire duration of the session. The confirmation of validity 120 may further entail verification of user privileges against a black list of users not permitted access at this location for a reason decided by the network provider, and a set of permitted access hours outside which no user is allowed access to network resources 6.

Referring to FIGS. 1, 2, 3 and 7, the access manager 18, 101, web server 13,102, AM server 15, 103 and database server 14, 104 communicate during the user 1, 100 sessions to record a plurality of session related information in accounting records 150. This information typically includes the ID 151 of user 1,100 associated with his personal entity 4 such as his cellular telephone 10. This allows for traceability of guest access within the ad hoc guest user network provisioning system 5. Accounting records 150 may also include other session related information such as session start time 152, end time 153, duration 154, volume of data transferred 155 and network locations accessed 156 such as websites addresses (URLs). Those skilled in the art should recognize that other information may be logged by the system 5.

Referring to FIGS. 1 and 4, a user 1 with an electronic terminal 7 such as a laptop 30 or PDA 31 or IP telephone 34 may, in addition to being granted access to network resources 6 such as the Internet 36, be further granted access to specific parts of the protected private LAN 44 such as a file server 200, a printer 201, a fax server 202, an email server 203 or other private network services that are normally accessed by workstations 45 only on private LAN 44.

Referring to FIGS. 1, 2 and 3, another preferred embodiment would include electronic security verifications of the electronic terminal 7 prior to granting access at step 125. This will include virus and spyware verification as well as general verification of electronic terminal behavior to prevent reliability and security breaches within system 5. Within that context, the electronic terminal behavior in terms of network traffic, processor performance, types of network requests and others may be compared to predetermined sets of behavior stored at the access manager 18 to detect abnormal situations. Should such irregularities be found, the electronic terminal 7 would not be granted access.

Referring to FIGS. 1, 2 and 4, in another preferred embodiment user 1 would not be a human person, rather a software, hardware or combination of both residing on an electronic terminal 7 such as a laptop 19, a PDA 8 or an IP telephone 24. Those skilled in the art would recognize that other sorts of electronic terminals with computing capabilities may also be included. As users, the software or hardware entities on electronic terminals would automatically engage communication with the authentication interface 2 through the wireless AP 9 with the goal of accessing network resources 6 such as the Internet 11, processes and applications in their home network 47 or local resources such as file servers 200, printers 201, fax servers 202, email servers 203 or other local and protected servers and networking resources. Automated users will provide to the authentication interface 2 a unique identifier associated with a trusted account such as a cellular telephone number, a mobile fax cellular number, a pager number, or an email address. The validation entity 3 would send the password for the system 5 as previously disclosed to the trusted account and the automated user would have access to this account through an embedded terminal such as a cellular telephone card, a pager card and others. From then on, authentication proceeds as for regular human users and the automated users gains accesses to network resources 6 within the system 5.

Referring to FIGS. 1, 2 and 4, in other preferred embodiments the authentication interface 2 is not a web interface such as illustrated in FIG. 6 but can be other sorts of processes running on local or remote servers such as a SMS server, a fax server, a chat server, an email server, or others. In this case, the user 1 provides the unique identifier associated with his personal entity 4 by respectively transmitting an SMS message to an SMS server based authentication interface, a fax message to the fax server, a text message to the char server, and an email message to the email server. The authentication interface communicates with the validation entity 3 as previously disclosed and the remainder of the system remains unchanged. In yet other embodiments (not illustrated), the authentication interface can consist in a physical security access units that a user 1 can access through a plurality of components such as a security access card that is inserted into the physical security access unit, a radio frequency (RF) enabled security access tag that communicates through radio waves with said access unit, or an infrared (IR) enabled security access tag that communicates through infrared waves with said access unit. In this embodiment, the components described above contain stored data consisting in at least the unique identifier associated with the personal terminal 4 of user 1, and possibly other information such as user 1 name, contact information, and others. Upon communicating with the access unit that serves as the authentication interface 2 in this embodiment the components provide the unique identifier that enables the validation entity 3 to authenticate user 1 and grant or reject access to network resources 6 within system 5.

Referring collectively to FIGS. 1, and 2, in other preferred embodiments the validation entity 3 does not consist in an authentication server farm 12 as illustrated in FIG. 2 but can be of another nature such as human IT operators that are enabled to receive the unique identifier associated with the user's 1 personal entity 4, validate the access request and manually issue authorization to the system to allow user access to network resources 6.

Referring collectively to FIGS. 1 and 2, in other preferred embodiments, the reliability of password transmission through SMS can further be enhanced by introducing a feedback loop to a monitoring system that will track password delivery and initiate action in case of failure. The monitoring system can be automated or may include IT personnel communicating with SMS aggregator 16 through web or API interfaces to check on undelivered messages. Upon detection of failure, IT personnel may force SMS retransmission or communicate with the user directly over his cellular telephone to provide him with the password.

Figure 8:
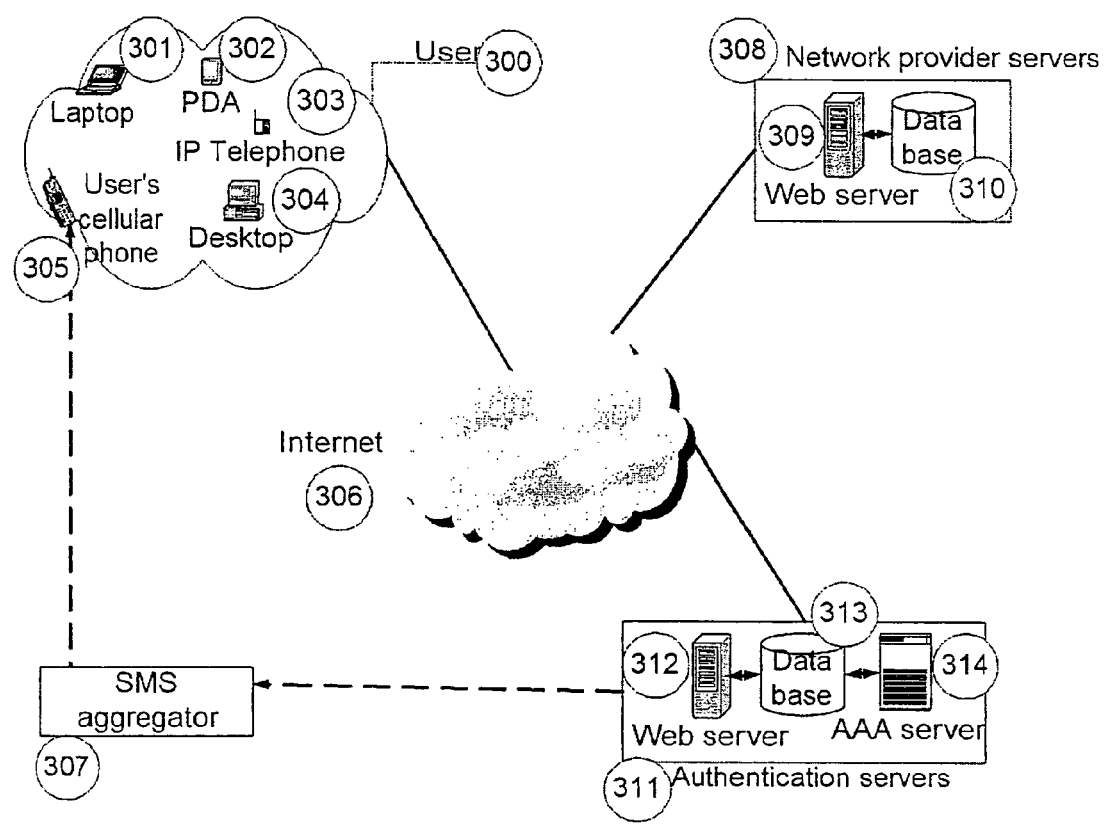
FIG. 8 is a system-level block diagram of a known user accessing Internet services.

Referring collectively to FIGS. 1 and 8, in another embodiment, the system includes a user 1, 300 attempting authentication to access network resources 6 preferably located on a server farm of a service provider 308 that possibly contains a web server 309 and a database server 310. User 1, 300 already has access to the Internet. User 1, 300 is not a guest that is unknown to the service provider 308. Instead, the user 1, 300 already has an account with the service provider 308 containing at least a unique identifier of a personal entity 4 associated with the user such as a cellular telephone 305 number. The user 1, 300 may access the services using a variety of electronic terminals such as a laptop computer 301, a desktop computer 304, a PDA 302 or an IP telephone 303. The electronic terminal connects to the Internet possibly through an Internet service provider (not illustrated). A second server farm 311 plays the role of an independent authentication server farm containing at least one database server 313, one AAA server 314 and possibly a webserver 312.

When user 1, 300 attempts access to network resources 6 such as protected web pages located in the network providers servers 308, the user is redirected to a login page and is prompted to enter a username associated with an account already existing with the network provider of servers 308. This login page may be located within 308 or 311 and effectively serves as the authentication interface 2. The user's account information may additionally be stored in 308 or 311 or both. In a preferred embodiment, a unique identifier associated with a personal entity 4 of the user 1, 300 is stored in database server 313. The system 311 generates a one-time password and sends that password to the user's personal entity, preferentially a cellular telephone 305. The SMS may be sent through an SMS aggregator 307 although those skilled in the art will recognize that other means for SMS transmission exist as detailed above in this document. The system 311 effectively plays the role of validation entity 3. Upon receipt of the password, the user enters his username and password into the web authentication interface and after system verification at 308 and 311 is granted access to protected web content in 308.

In addition to authenticating and identifying users, the method described in the previous paragraph reassures users that they are indeed accessing the network resources they have asked for, not malicious resources pretending to be legitimate to trick them into scams. Examples of such scams are phishing scams where users are tricked by websites pretending to be legitimate sites known and trusted by users. Those users are asked to enter personal and private information at those malicious sites. This method prevents such scams since users get one-time system generated passwords that they receive using their cellular telephone number known only by the legitimate sites such as banking sites, health related sites, and others. In this method, in addition to authenticating the user, the user authenticates network resources 6 as well. It is in effect a two-way authentication and identity verification.

As set forth in detail above, the present invention discloses an inherited trust authentication mechanism that enables and facilitates ad hoc controlled user access to wireless and wireline IP communication networks while maintaining privacy for users and traceability for network providers. The present invention shows that for users trying to access network resources through a network provider with whom they have no prior relationship, an infrastructure is needed to enable easy user access while giving network providers the ability to determine the identity of users in a reliable manner. This is achieved by leveraging on an already established trust relationship between the user and another provider, preferentially a telecommunications provider of cellular telephony services. By asking a user to enter his cellular telephone number on a web interface viewed through a computer and sending the associated password to another entity, namely his cellular telephone number, network providers ensure users are indeed who they claim to be. In addition, the system has been shown to enable support for reliable authentication of network providers themselves in the case of known users accessing protected Internet resources such as secure web pages of network providers. By generating one-time passwords and sending them to a cellular telephone number associated with the user and already stored in the system, the level of reliability and traceability is significantly enhanced both for the network provider and the user thus preventing malicious attacks such as the recently spreading phishing scams. This method enables the system to validate the user's identity as well as the user to validate the Internet resources' identity.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A computer implemented method for preventing phishing scams so that a user is able to authenticate electronic services through an untrusted electronic terminal, said user being associated with a username and a trusted personal entity, said method comprising the steps of:
 (a) said user providing said username to an authentication interface;
 (b) sending said username to at least one validation entity;
 (c) identifying said username as an authentication request at said validation entity by an authentication application;
 (d) looking up with said username in said validation entity whether said username is already registered in said validation entity:
  i. if said username is registered with said validation entity, retrieving a unique identifier of said trusted personal entity associated with said user and generating a one time password, and sending said password to said trusted personal entity using said unique identifier;

ii. if said username is not registered with said validation entity, said authentication application rejecting the authentication attempt;

(e) said user, after retrieving said password from said trusted personal entity, providing said unique identifier and said password to said authentication interface, whereby an application permits access to electronic services through said untrusted electronic terminal and said application recording said electronic services to an account associated with said unique identifier, wherein identifying said username is performed by a processor functionally associated with the computer, and wherein the processor identifies by executing computer-readable instructions embedded on a computer readable storage medium.

2. A method according to claim 1, wherein said user is a human person or software or hardware or a combination of hardware and software.

3. A method according to claim 1, wherein said untrusted electronic terminal is a mobile terminal or fixed terminal.

4. The method of claim 3, wherein said mobile terminal is a laptop computer or a personal digital assistant (PDA) or an IP telephone.

5. The method of claim 3, wherein said fixed terminal is a desktop computer.

6. A method according to claim 1, wherein said authentication interface is a web interface accepting authentication requests.

7. The method of claim 6, wherein said web interface resides on at least one web server communicating with at least one database server.

8. A method according to claim 1, wherein said authentication interface is a software or hardware or combination of hardware and software or a human person accepting authentication requests or a combination thereof.

9. The method of claim 8, wherein said authentication interface is at least one SMS server or at least one email server or at least one chat server or at least one voice server or at least one fax server or a combination thereof communicating with at least one database server.

10. The method of claim 8, wherein said authentication interface is at least one phone set or at least one fax machine or a combination thereof.

11. The method of claim 8, wherein said authentication interface is at least one physical security access unit.

12. The method of claim 1, wherein said user accesses said authentication interface through said untrusted electronic terminal.

13. The method of claim 12, wherein said untrusted electronic terminal communicates with said authentication interface through at least one data network.

14. The method of claim 12, wherein said untrusted electronic terminal communicates with said authentication interface through at least one wireline connection or at least one wireless connection or a combination thereof.

15. The method of claim 1, wherein said user accesses said authentication interface through a security access card and said security access card is inserted into said authentication interface and said unique identifier is an embedded property of the security access card.

16. The method of claim 1, wherein said user accesses said authentication interface through a radio frequency (RF) enabled security access tag and said radio frequency enabled security access card communicates with said authentication interface through radio waves and said unique identifier is an embedded property of the security access card.

17. The method of claim 1, wherein said user accesses said authentication interface through an infrared (IR) enabled security access tag and said infrared enabled security access card communicates with said authentication interface through infrared waves and said unique identifier is an embedded property of the security access tag.

18. A method according to claim 1, wherein said trusted personal entity is a mobile terminal or fixed terminal.

19. The method of claim 18, wherein said mobile terminal is a cellular phone and said unique identifier is a phone number of said cellular telephone, or said mobile terminal is a mobile fax machine and said unique identifier is a fax number of said mobile fax machine, or said mobile terminal is a laptop computer and said unique identifier is an email address, or said mobile terminal is a personal digital assistant (PDA) and said unique identifier is an email address, or said mobile terminal is a pager and said unique identifier is a pager number.

20. The method of claim 18, wherein said fixed terminal is a phone set and said unique identifier is a phone number of said phone set, or said fixed terminal is a fax machine and said unique identifier is a fax number of said fax machine, or said fixed terminal is a desktop computer, and said unique identifier is an email address of said desktop computer.

21. The method of claim 1, wherein said step (b) is characterized in that said validation entity is a server farm containing at least one database server or at least one web server or a combination thereof, or said validation entity is at least one human person.

22. The method of claim 1, wherein said step (b) is characterized in that said validation entity is a centralized or decentralized server farm or a combination thereof.

23. The method of claim 1, wherein said step (b) is characterized in that said username is sent by SMS or by email or by pager or by fax or a combination thereof.

24. The method of claim 1, wherein said step (b) is characterized in that said username is sent over a network connection.

25. The method of claim 24 wherein, said network connection travels over the Internet or over a local area network (LAN) or a combination thereof.

26. The method of claim 1, wherein said step (d)i is characterized in that said one time password is sent by SMS or by email or by fax or by IVR or in a pager message or a combination thereof 27. The method of claim 1, wherein said step (d)i is characterized in that said one time password is sent over a network connection.

28. The method of claim 27 wherein, said network connection travels over the Internet or over local area network (LAN) or a combination thereof.

29. A computer implemented system for preventing phishing scams so that a user is able to authenticate electronic services through an untrusted electronic terminal, said user being associated with a username and a trusted personal entity, said personal entity having a unique identifier, said system comprising:

(a) an authentication interface, said authentication interface being adapted to receive said username and to send said username to at least one validation entity;

(b) said validation entity being adapted to retrieve said unique identifier of said trusted personal entity associated with said user and generate a one time password and said validation entity being adapted to send said password to said trusted personal entity using said unique identifier (c) whereby said authentication interface is further adapted to receive said unique identifier and said password and to enable access to said electronic services through said untrusted electronic terminal upon confirmation, wherein the system utilizes a processor of the computer to perform said generation step, and wherein utilizing the processor comprises utilizing the processor to perform the generation step by executing computer-readable instructions on a computer-readable storage medium.

30. A system according to claim 29, wherein said electronic services are internet services or voice telecommunications services or data telecommunications services or local area network (LAN) resources or a combination thereof.

31. A system according to claim 29, wherein said electronic services are local or foreign or a combination of local and foreign services to the network said user is connecting to.

32. The system of claim 29, wherein said electronic services comprise access to local area network (LAIN) servers or local area network (LAN) data traffic or a combination thereof.

33. A system according to claim 29, wherein said untrusted electronic terminal is a mobile terminal or fixed terminal.

34. The system of claim 33, wherein said mobile terminal is a laptop computer or a personal digital assistant (PDA) or an IP telephone or a combination thereof.

35. The system of claim 33, wherein said fixed terminal is a desktop computer.

36. A computer implemented method of performing virus and spyware checks upon authentication of a user attempting to access electronic services through an untrusted electronic terminal said method comprising the steps of:
  (a) said user accessing an authentication interface through said untrusted electronic terminal and inputting a username associated with said user;
  (b) sending said username to at least one validation entity;
  (c) identifying said username as an authentication request at said validation entity;
  (d) said validation entity prompting said user to accept said virus and spyware checks in said untrusted electronic terminal;
  (e) said validation entity performing said virus and spyware checks upon acceptance of said user;
  (f) said validation entity verifying results of said virus and spyware checks and:
    i. if said results do not indicate the presence of virus or spyware in said untrusted electronic terminal, looking up with said username a unique identifier of a trusted personal entity associated with said user, generating a random confirmation code, and sending said code to said user using said unique identifier of said trusted personal entity:
    ii. if results indicate the presence of virus or spyware in said untrusted electronic terminal, rejecting the authentication attempt;
  (g) said user, after retrieving said code from said trusted personal entity, providing said unique identifier and said code to said authentication interface, whereby an application permits access to electronic services through said untrusted electronic terminals, wherein identifying comprises utilizing a processor functionally associated with a computer, and wherein the processor identifies by executing computer-readable instructions embedded on a computer-readable medium.

37. A method according to claim 36, wherein said user is a human person or software or hardware or a combination of hardware and software.

38. A method according to claim 36, wherein said untrusted electronic terminal is a mobile terminal or fixed terminal.

39. The method of claim 38, wherein said mobile terminal is a laptop computer or a personal digital assistant (PDA) or an IP telephone.

40. The method of claim 38, wherein said fixed terminal is a desktop computer.

41. A method according to claim 36, wherein said authentication interface is a web interface accepting authentication requests.

42. The method of claim 41, wherein said web interface resides on at least one web server communicating with at least one database server.

43. A method according to claim 36, wherein said authentication interface is a software or hardware or combination of hardware and software or a human person accepting authentication requests or a combination thereof.

44. The method of claim 43, wherein said authentication interface is at least one SMS server or at least one email server or at least one chat server or at least one voice server or at least one fax server or combination thereof communicating with at least one database server.

45. The method of claim 43, wherein said authentication interface is at least one phone set or at least one fax machine or a combination thereof.

46. The method of claim 43, wherein said authentication interface is at least one physical security access unit.

47. The method of claim 36, wherein said user accesses said authentication interface through said untrusted electronic terminal.

48. The method of claim 47, wherein said untrusted electronic terminal communicates with said authentication interface though at least one data network.

49. The method of claim 47, wherein said untrusted electronic terminal communicates with said authentication interface through at least one wireline connection or at least one wireless connection or a combination thereof.

50. The method of claim 36, wherein said user accesses said authentication interface through a security access card and said security access card is inserted into said authentication interface and said unique identifier is an embedded property of the security access card.

51. The method of claim 36, wherein said user accesses said authentication interface through a radio frequency (RF) enabled security access tag and said radio frequency enabled security access card communicates with said authentication interface through radio waves and said unique identifier is an embedded property of the security access card.

52. The method of claim 36, wherein said user accesses said authentication interface through an infrared (IR) enabled security access tag and said infrared enabled security access card communicates with said authentication interface through infrared waves and said unique identifier is an embedded property of the security access tag.

53. A method according to claim 36, wherein said personal entity is a mobile terminal or fixed terminal.

54. The method of claim 53, wherein said mobile terminal is a cellular phone and said unique identifier is a phone number of said cellular telephone, or said mobile terminal is a mobile fax machine and said unique identifier is a fax number of said mobile fax machine, or said mobile terminal is a laptop computer and said unique identifier is an email address, or said mobile terminal is a personal digital assistant (PDA) and said unique identifier is an email address, or said mobile terminal is a pager and said unique identifier is a pager number.

55. The method of claim 53, wherein said fixed terminal is a phone set and said unique identifier is a phone number of said phone set, or said fixed terminal is a fax machine and said unique identifier is a fax number of said fax machine, or said fixed terminal is a desktop computer, and said unique identifier is an email address of said desktop computer.

56. The method of claim 36, wherein said step (b) is characterized in that said validation entity is a server farm containing at least one database server or at least one web server or combination thereof, or said validation entity is at least one human person.

57. The method of claim 36, wherein said step (b) is characterized in that said validation entity is a centralized or decentralized server farm or a combination thereof.

58. The method of claim 36, wherein said step (b) is characterized in that said username is sent by SMS or by email or by pager or by fax or a combination thereof.

59. The method of claim 36, wherein said step (b) is characterized in that said username is sent over a network connection.

60. The method of claim 59 wherein, said network connection travels over the Internet or over a local area network (LAN) or a combination thereof.

61. The method of claim 36, wherein said step (f)i is characterized in that said code is sent by SMS or by email or by fax or by IVR or in a pager message or a combination thereof.

62. The method of claim 36, wherein said step (f)i is characterized in that said code is sent over a network connection.

63. The method of claim 62 wherein, said network connection travels over the Internet or over local area network (LAN) or a combination thereof.

64. A computer implemented system for performing virus and spyware checks upon authentication of a user attempting to access electronic services through an untrusted electronic terminal, said user being associated with a username, said system comprising:
  (a) an authentication interface, said authentication interface being adapted to receive said username and to send said username to at least one validation entity;
  (b) said validation entity being adapted to receive said username and prompt said user to accept said virus and spyware checks in said untrusted electronic terminal;
  (c) said validation entity being adapted to perform said virus and spyware checks upon acceptance of said user;
  (d) said validation entity being adapted to verify results of said virus and spyware checks and:
    i. if said results do not indicate the presence of virus or spyware in said untrusted electronic terminal, said validation entity being adapted to look up with said username a unique identifier of a trusted personal entity associated with said user, generating a random confirmation code, and sending said code to said user using said unique identifier of said trusted personal entity:
    ii. if results indicate the presence of virus or spyware in said untrusted electronic terminal, said validation entity being adapted to reject the authentication attempt;
  (e) whereby said authentication interface is further adapted to receive said unique identifier and said code and to enable access to said electronic services through said electronic terminal upon confirmation,
    wherein the computer implemented system utilizes a processor of a computer to perform said verify step, and wherein utilizing the processor comprises utilizing the processor to perform the verify step by executing computer-readable instructions on a computer-readable storage medium.

65. A system according to claim 64, wherein said electronic services are internet services or voice telecommunications services or data telecommunications services or local area network (LAN) resources or a combination thereof.

66. A system according to claim 64, wherein said electronic services are local or foreign or a combination of local and foreign services to the network said user is connecting to.

67. The system of claim 64, wherein said electronic services comprise access to local area network (LAN) servers or local area network (LAN) data traffic or a combination thereof.

68. A system according to claim 64, wherein said electronic terminal is a mobile terminal or fixed terminal.

69. The system of claim 68, wherein said mobile terminal is a laptop computer or a personal digital assistant (PDA) or a combination thereof.

70. The system of claim 68, wherein said fixed terminal is a desktop computer.

* * * * *